US012742326B2

(12) United States Patent
Osborne et al.

(10) Patent No.: US 12,742,326 B2
(45) Date of Patent: Sep. 22, 2026

(54) ROOF CUTTER

(71) Applicant: FRANK P. FREY AND COMPANY, Bensenville, IL (US)

(72) Inventors: Richard Osborne, Bensenville, IL (US); Paul Boccuzzi, Bensenville, IL (US); Brian Joy, Bensenville, IL (US)

(73) Assignee: FRANK P. FREY AND COMPANY, Bensenville, IL (US)

(*) Notice: Subject to any disclaimer, the term of this patent is extended or adjusted under 35 U.S.C. 154(b) by 0 days.

(21) Appl. No.: 17/987,427

(22) Filed: Nov. 15, 2022

(65) Prior Publication Data

US 2023/0287686 A1 Sep. 14, 2023

Related U.S. Application Data

(63) Continuation of application No. 16/793,928, filed on Feb. 18, 2020, now Pat. No. 11,499,318.

(60) Provisional application No. 62/806,350, filed on Feb. 15, 2019.

(51) Int. Cl.

| | |
|---|---|
| ***E04D 15/04*** | (2006.01) |
| ***B26B 5/00*** | (2006.01) |
| ***B26D 5/02*** | (2006.01) |
| *B26D 1/00* | (2006.01) |

(52) U.S. Cl.
CPC .............. *E04D 15/04* (2013.01); *B26B 5/005* (2013.01); *B26D 5/02* (2013.01); *B26D 2001/0046* (2013.01)

(58) Field of Classification Search
CPC ....... E04D 15/00; E04D 15/04; E04D 15/003; E04D 15/02; B26D 5/02
See application file for complete search history.

(56) References Cited

U.S. PATENT DOCUMENTS

| | | |
|---|---|---|
| 5,241,946 A | 9/1993 | Yelton et al. |
| 7,373,859 B1 | 5/2008 | Shirlin et al. |
| 11,499,318 B2 | 11/2022 | Osborne et al. |

(Continued)

FOREIGN PATENT DOCUMENTS

| | | |
|---|---|---|
| CN | 108356991 A | 8/2018 |

OTHER PUBLICATIONS

"Non- Final Office Action received for U.S. Appl. No. 16/793,928, mailed on Dec. 23, 2021".

(Continued)

*Primary Examiner* — Jennifer S Matthews
(74) *Attorney, Agent, or Firm* — Kutak Rock LLP; Eric S. Endsley

(57) ABSTRACT

A roof cutter and a method of cutting a roof is provided. The roof cutter includes a base that is movable between a retracted configuration and a cutting configuration. In the retracted configuration, the blade is displaced from the roof. In the cutting configuration, the blade is positioned so as to facilitate cutting of the roof. The roof cutter includes a stop assembly and an engagement member that is configured to engage with the stop assembly when the base is in the cutting configuration, thereby establishing a maximum cutting depth. A dampening mechanism softens impacts associated with the blade moving to the cutting depth and absorbs vibrations associated with cutting the roof at the cutting depth. An adjustment assembly is configured to selectively adjust the cutting depth and/or to selectively restrain the base in the retracted configuration, thereby preventing the blade from cutting the roof.

14 Claims, 6 Drawing Sheets

(56) References Cited

U.S. PATENT DOCUMENTS

| | | | |
|---|---|---|---|
| 2007/0164598 | A1 | 7/2007 | Johnson et al. |
| 2007/0245684 | A1 | 10/2007 | Bremer, Jr. |
| 2015/0204415 | A1 | 7/2015 | Bateman et al. |
| 2019/0376295 | A1 | 12/2019 | Kingham |
| 2020/0325687 | A1 | 10/2020 | Osborne et al. |

OTHER PUBLICATIONS

"Notice of Allowance received for U.S. Appl. No. 16/793,928, Mailed on Jul. 13, 2022".

ROOF CUTTER

CROSS-REFERENCE TO RELATED APPLICATIONS

This application is a continuation application of co-pending U.S. patent application Ser. No. 16/793,928, filed Feb. 18, 2020, now U.S. Pat. No. 11,499,318 issued Nov. 15, 2022, which claims priority pursuant to 35 U.S.C. 119(e) to U.S. Provisional Patent Application Ser. No. 62/806,350, filed Feb. 15, 2019, the entire disclosure of which is incorporated herein by reference

FIELD OF THE INVENTION

The present invention relates generally to roofing equipment. More specifically, the present invention is concerned with commercial roof cutters and dampening mechanisms incorporated therein to reduce operational stresses on a user.

BACKGROUND

Flat roofs, such as flat commercial roofs and other similar structures (each a "roof structure"), include several layers of materials for strengthening, protecting, and/or weatherproofing the roof. As a result, cutting holes in such roofs can be very difficult, often requiring specialized roof cutters. These roof cutters include a blade for cutting through the various layers of the roof and a handle for allowing an operator to guide the cutter. Unfortunately, using existing cutters to cut through typical roof structures subjects the operator (and the cutter) to a great deal of vibration, thereby increasing the risk of injury to the user (and/or damage to the cutter and/or to the roof). Consequently, it would be beneficial to have a system for and a method of mitigating vibrations.

Existing powered roof cutters include a base for holding a blade relative to a roof, such as while cutting the roof and/or while positioning the cutter for cutting the roof. Accordingly, the cutter is moveable between a cutting configuration for cutting the roof and a retracted configuration for positioning the cutter. More specifically, the base is rotatably moveable between a cutting position and a retracted position, respectively, by pivoting the base about a rear axle of the cutter. In this way, the blade, which is displaced forward of the rear axle, moves along an arc as it moves into engagement with the roof and as it cuts deeper into the roof. Unfortunately, movement of such bases from retracted to cutting configurations often results in a hard impact, depending on the skill of the operator, the structure of the roof, and other factors. These hard impacts can cause harm to the operator and/or damage to the cutter 10 and/or the roof. Consequently, it would be beneficial to have a system for and a method of mitigating hard impacts associated with moving cutters between retracted and cutting configurations.

SUMMARY

The present invention comprises a cutter for cutting roofs and other structures (each structure referred to herein as a "roof"). The cutter includes a dampening mechanism, such as a spring or the like, that is configured to soften impacts and/or to absorb vibrations.

The foregoing and other objects are intended to be illustrative of the invention and are not meant in a limiting sense. Many possible embodiments of the invention may be made and will be readily evident upon a study of the following specification and accompanying drawings comprising a part thereof. Various features and subcombinations of invention may be employed without reference to other features and subcombinations. Other objects and advantages of this invention will become apparent from the following description taken in connection with the accompanying drawings, wherein is set forth by way of illustration and example, an embodiment of this invention and various features thereof.

BRIEF DESCRIPTION

A preferred embodiment of the invention, illustrative of the best mode in which the applicant has contemplated applying the principles, is set forth in the following description and is shown in the drawings and is particularly and distinctly pointed out and set forth in the appended claims.

DETAILED DESCRIPTION

As required, a detailed embodiment of the present invention is disclosed herein; however, it is to be understood that the disclosed embodiment is merely exemplary of the principles of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
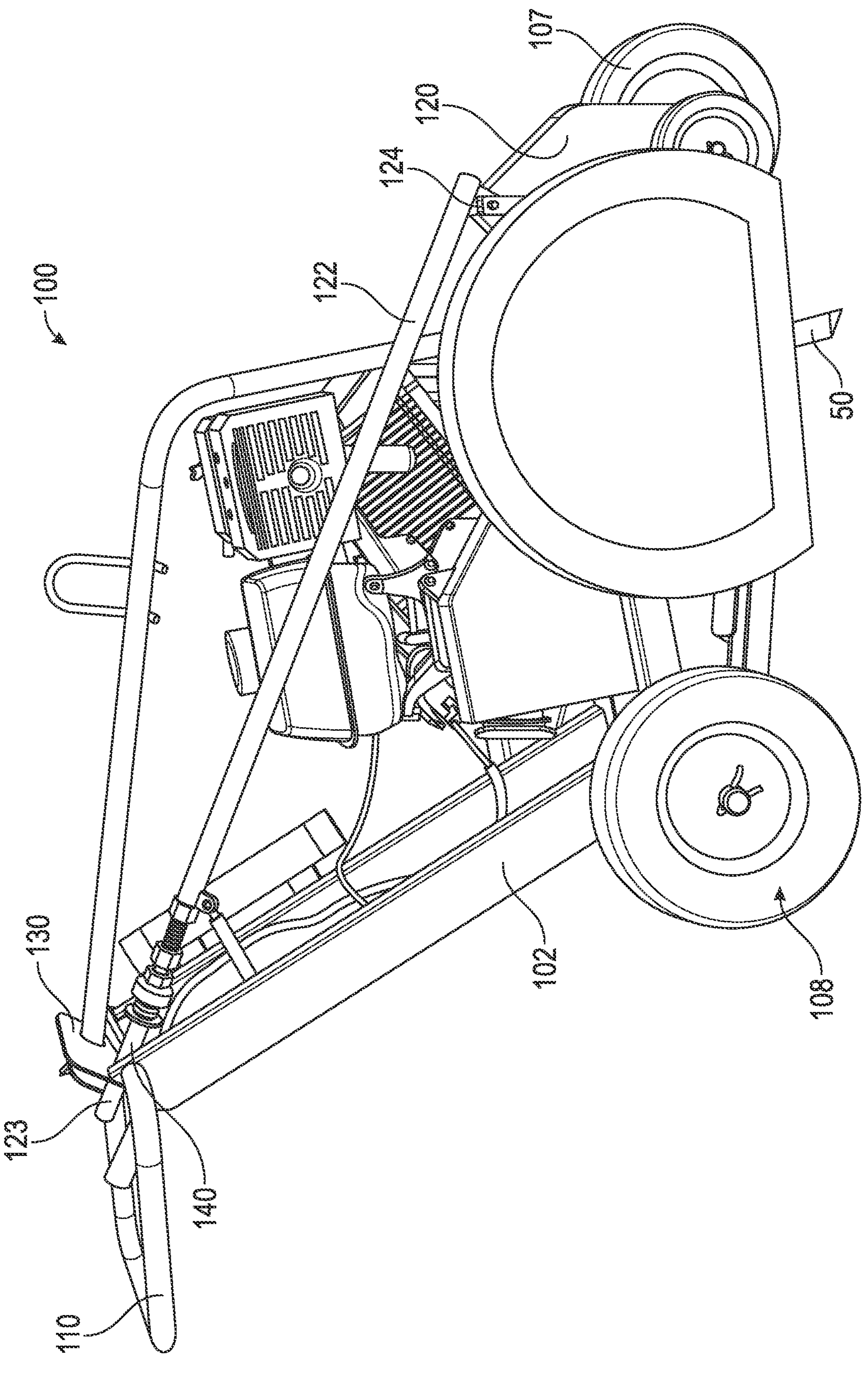
FIG. 1 is a side view of a roof cutter.
Figure 2A:
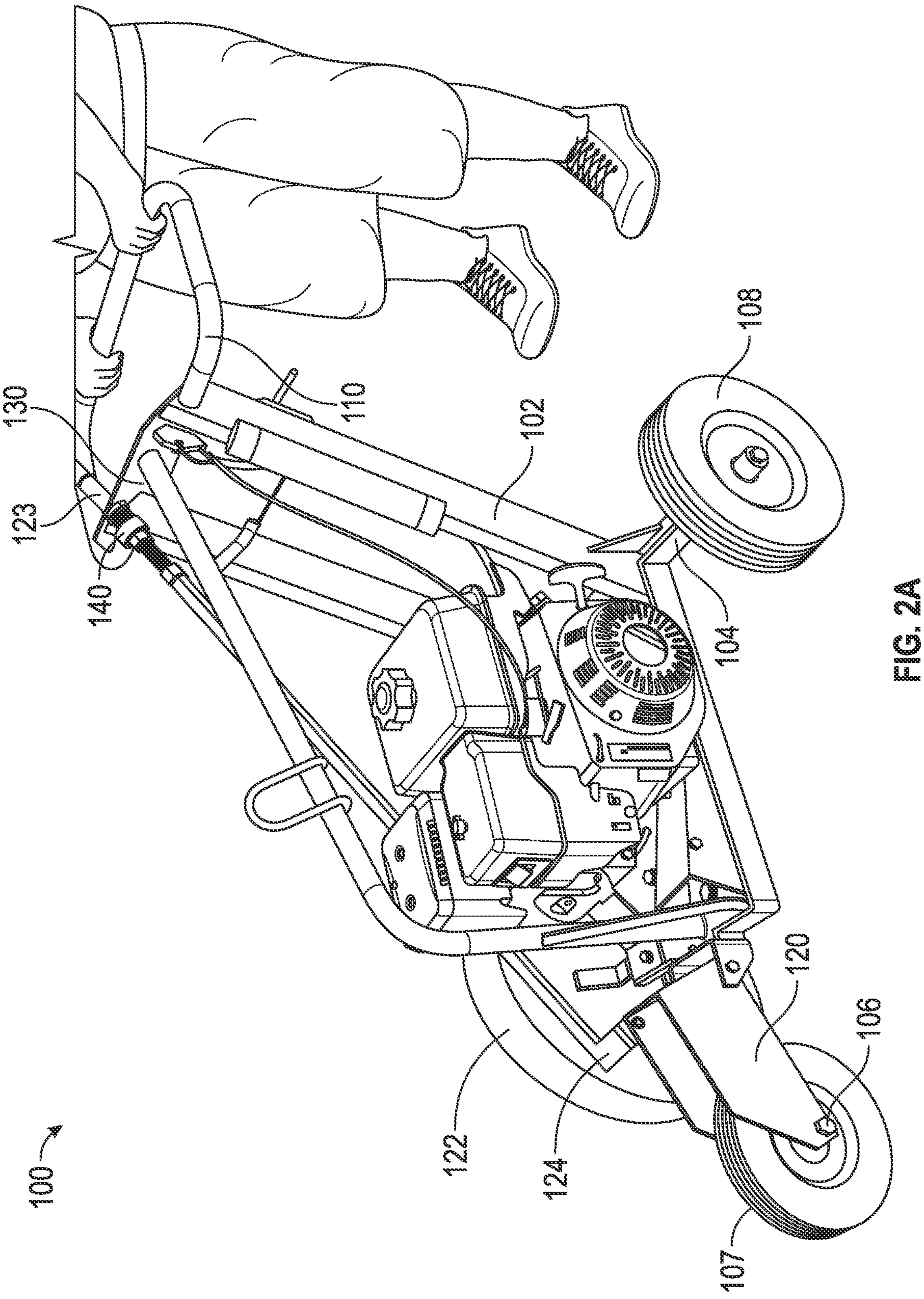
FIG. 2A is a perspective view of a roof cutter of the present invention, a stop assembly of the roof cutter being engaged with an engagement member of the roof cutter.
Figure 2B:
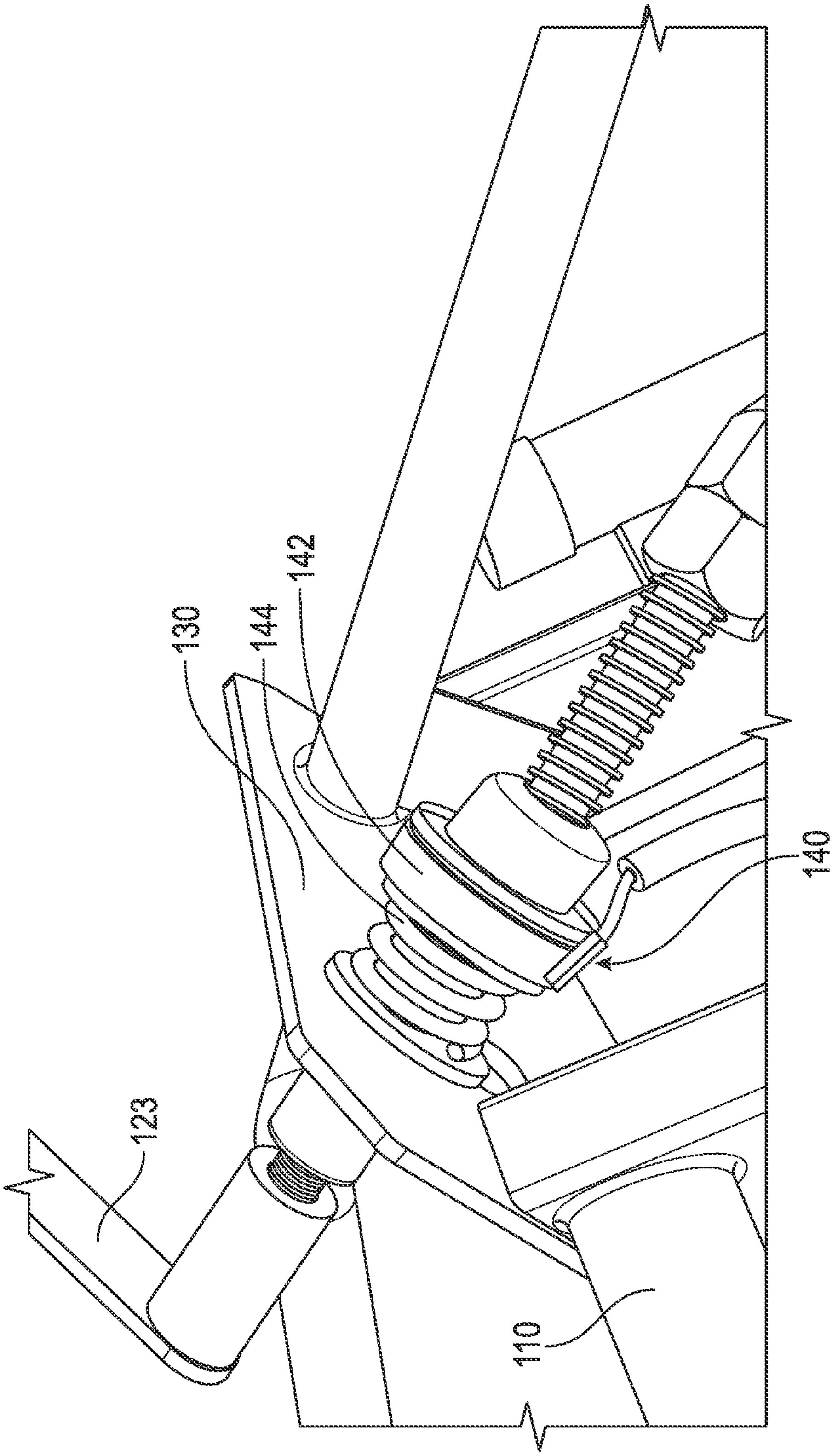
FIG. 2B is a partial perspective view a roof cutter of the present invention, shown on an enlarged scale, a stop assembly of the roof cutter being engaged with an engagement member of the roof cutter.
Figure 3A:
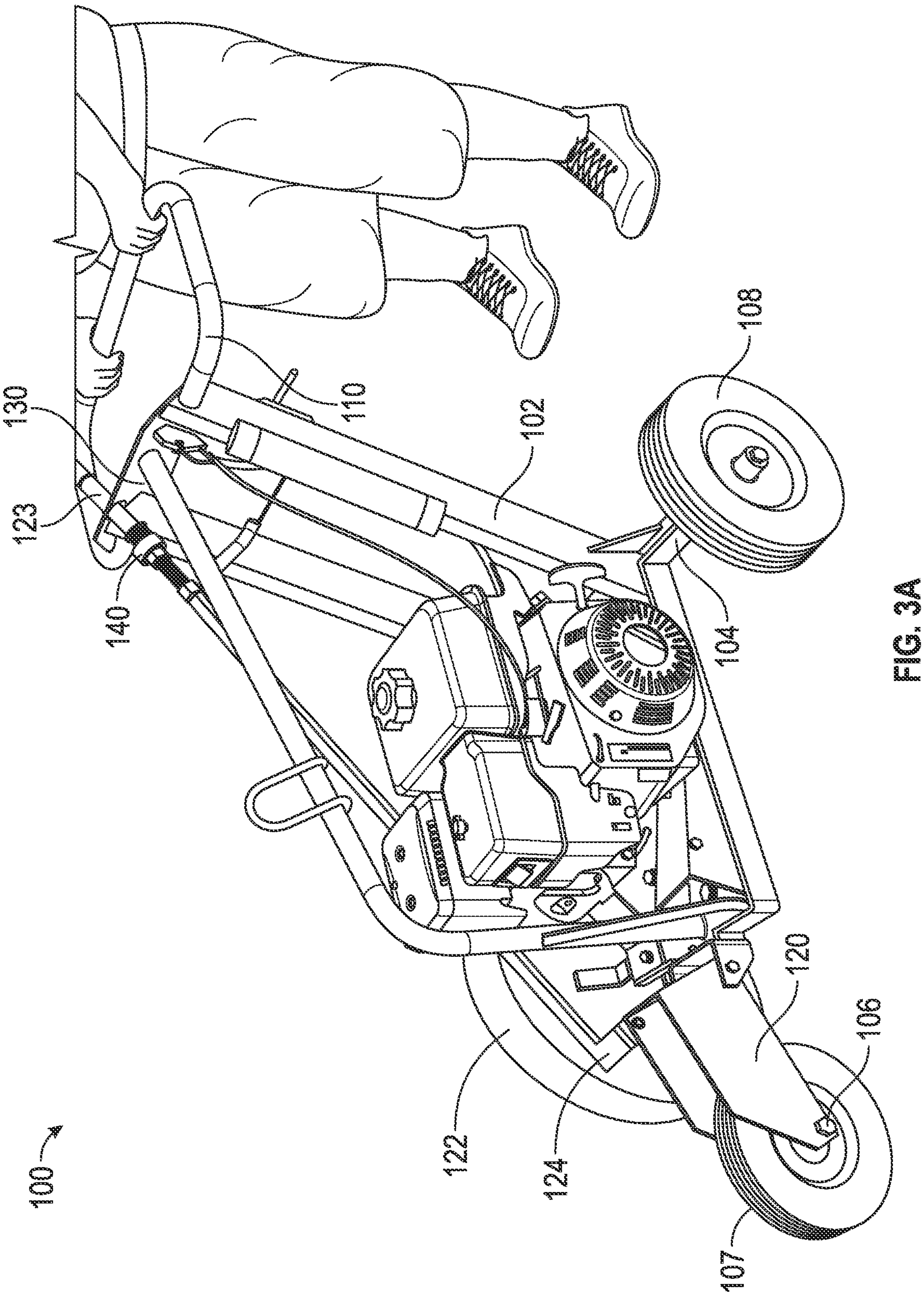
FIG. 3A is a perspective view of a roof cutter of the present invention, a stop assembly of the roof cutter being displaced from an engagement member of the roof cutter.
Figure 3B:
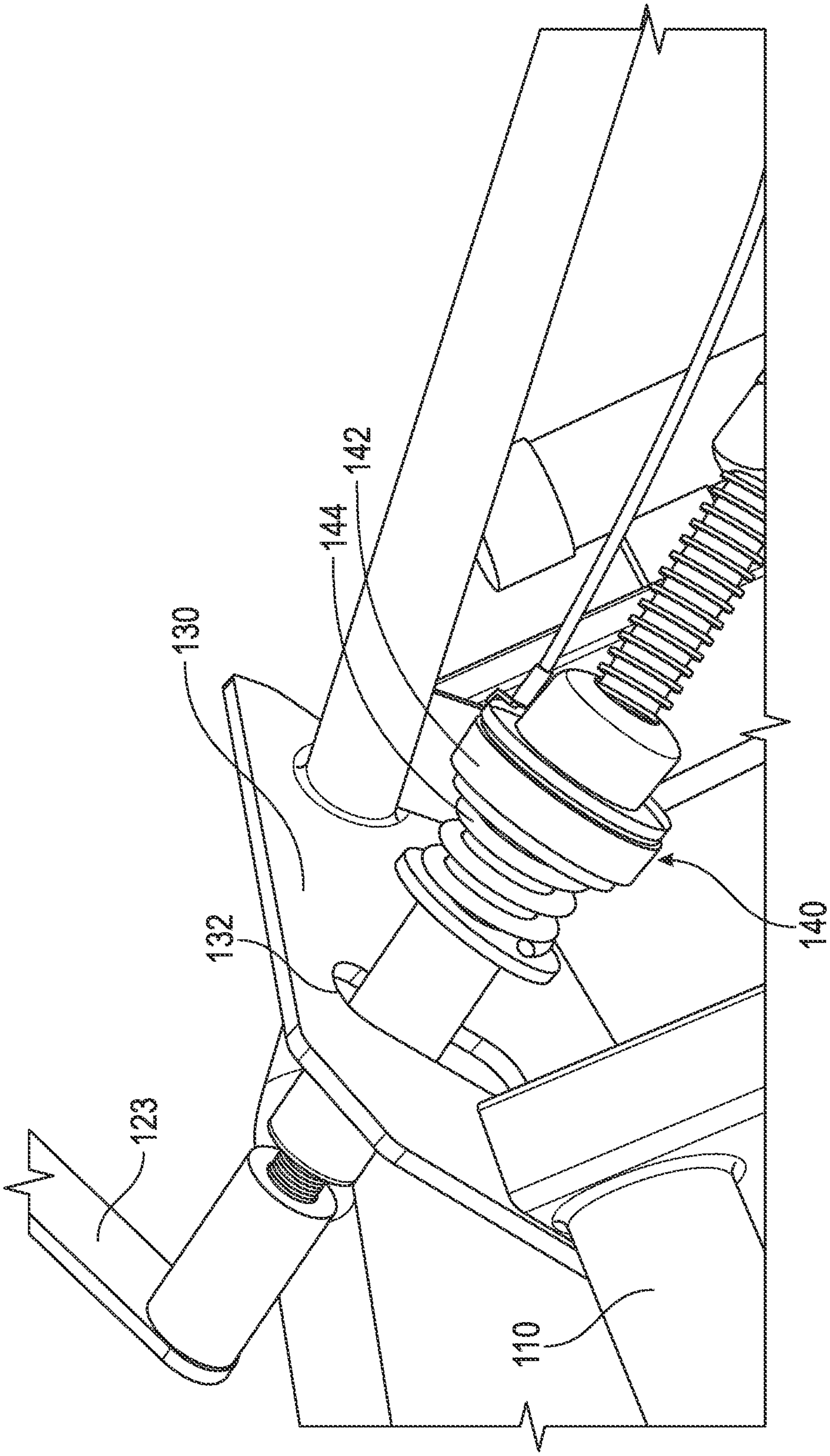
FIG. 3B is a partial perspective view of a roof cutter of the present invention, shown on an enlarged scale, a stop assembly of the roof cutter shown displaced from an engagement member of the roof cutter.
Figure 4:
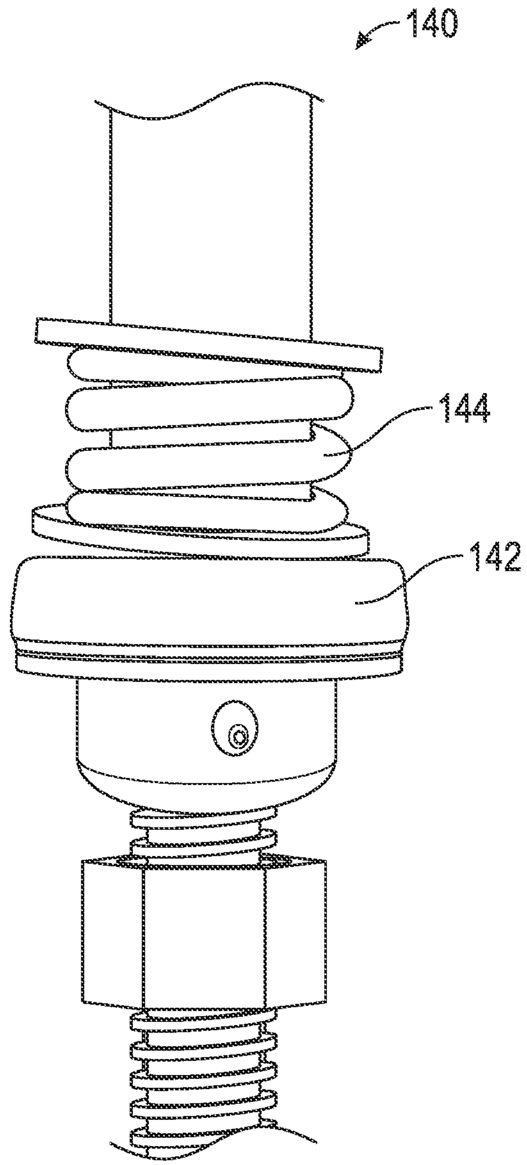
FIG. 4 shows a stop assembly of the present invention, the stop assembly having a dampening mechanism for softening impacts.

Referring to FIG. 1, a roof cutter 100 of the present invention includes a base 102 for supporting and positioning a blade 50 relative to a roof. The roof cutter 100 is moveable between a retracted configuration and a deployed (or cutting) configuration, such as by moving the base 102 between a retracted position and a deployed (or cutting) position, respectively. In the retracted configuration, the blade 50 is displaced from the roof, thereby preventing the blade from damaging the roof as the cutter 100 is moved along the roof. In the cutting configuration, the blade is configured to engage with the roof, thereby enabling the blade to cut into the roof. The blade is configured to cut the roof as the base 102 is moved towards the cutting configuration (i.e. cutting to a depth) and is further configured to cut the roof as the cutter 100 is moved along the roof while the roof cutter 100 is in the cutting configuration (i.e. cutting at a depth).

In some embodiments, the cutter 100 includes a means of adjusting a cutting depth such that the base 102 is moveable to a plurality of cutting positions or, in the alternative, such that the cutter 100 is configured to selectively prevent the base 102 from moving beyond each of a plurality of cutting positions. In some embodiments, the base 102 is rotatable about a rear axle 104 of the cutter 100 and the blade is displaced forward of the rear axle 104 such that the blade moves along an arc as the base 102 is rotated relative to the rear axle 104. In some embodiments, the rear axle 104 extends through and/or is positioned adjacent to a rear portion of the base 102, such as a proximal end of the base 102. In some embodiments, the cutter 100 includes a handle assembly 110 extending from the rear portion of the base 102, the handle assembly 110 including handles for facilitating operator control of the cutter 100. In some embodiments, the handle assembly 110 is configured to provide a mechanical advantage for moving the cutter between the retracted configuration and one or more cutting configuration.

In some embodiments, the cutter 100 includes a means for selectively preventing the base 102 from moving away from the retracted position and/or for preventing the base 102 from moving beyond one or more cutting position. In some embodiments, the base 102 includes a first linkage member 120 extending from the base 102, such as from a distal and/or front portion of the base 102. The first linkage member 120 is configured to engage, either directly or indirectly, with the roof so as to prevent or otherwise inhibit the base 102 from rotating beyond a certain point. In some embodiments, a distal end of the first linkage member 120 is coupled to a front wheel 107 of the cutter 100, the front wheel being configured to engage with the roof so as to facilitate movement of the cutter 100 along the roof while preventing or otherwise inhibiting the base 102 from rotating away from the retracted position and/or past one or more cutting position. In some embodiment, an axle 106 of the front wheel 107 is parallel with the rear axle 104 of the cutter 100. In some embodiments, the cutter 100 includes opposed first and second rear wheels 108 coupled to respective first and second ends of the rear axle 104, thereby facilitating movement of the cutter 100 along the roof. In some embodiments, the first linkage member 120 is rotatably coupled to the base 102 such that the length of the wheel base of the cutter 100 changes as the roof cutter 100 is moved between the retracted and cutting configurations.

In some embodiments, the cutter 100 includes a second linkage member 122 for preventing or otherwise inhibiting the first linkage member 120 from rotating relative to the base 102, thereby preventing or otherwise inhibiting the base 102 from moving away from the retracted position and/or past one or more cutting position. In some embodiments, the cutter 100 includes a third linkage member 124 extending between the first 120 and second linkage members 122, thereby providing a mechanical advantage for preventing or otherwise inhibiting rotation of the first linkage member 120 and/or for facilitating orientation of the second linkage member 122 in a favorable angle for extending away from the first linkage member 120. In some embodiments, the second linkage member 122 extends to and/or past a distal portion of the handle assembly 110 such that the handle assembly 110 serves as a fourth linkage of a linkage assembly for controlling and/or inhibiting movement of the first linkage member 120 relative to the base 102.

In some embodiments, the cutter 100 includes an engagement member 130 that is configured to slidably engage with the second linkage member 122. In some embodiments, the engagement member 130 defines an aperture 132 for receiving the second linkage member 122 and/or for otherwise engaging directly or indirectly with the second linkage member 122. In some embodiments, the second linkage member 122 slides relative to the engagement member 130 as the roof cutter moves between the retracted and cutting configurations. In some embodiments, the second linkage member 122 includes a stop member 142 (such as a flange or the like extending from the second linkage member 122) and/or is otherwise associated with a stop member 142 (such as a ledge, flange, or the like defined by and/or extending from an adjustment assembly 123). In some embodiments, the stop member 142 is configured to impact or otherwise engage with the engagement member 130 so as to prevent or otherwise inhibit the roof cutter 100 from moving away from the retracted configuration and/or from moving past one or more cutting configuration.

In some embodiments, the stop member 142 is part of a stop assembly 140 having a dampening mechanism 144, such as a spring or the like. In some embodiments, the dampening mechanism 144 is configured to soften impacts associated with the stop member 142 impacting the engagement member 130 and/or is configured to absorb vibrations associated with the cutter 100 cutting a roof while the stop member 142 is engaged with the engagement member 130. In some embodiments, the dampening mechanism 144 is a spring having a stiffness that is specifically designed to minimize harm to operators and/or damage to the cutter 100 and or a roof associated with impacts and/or vibrations.

In some embodiments, the second linkage member 122 includes an adjustment assembly 123 and/or is associated with an adjustment assembly 123. In some embodiments, the adjustment assembly 123 is configured to selectively adjust, prevent, or otherwise control travel of the second linkage member 122 relative to the engagement member 130, thereby adjusting, preventing, or otherwise controlling movement of the base 102 relative to the retracted configuration and/or relative to one or more cutting configuration. In this way, the system is configured to facilitate adjustment of cutting depths, thereby providing an operator with the ability to minimize damage to the roof or adjacent structure, such as wiring, plumbing, or the like positioned just below the roof.

The present invention also includes a method of cutting a roof. The method includes utilizing a roof cutter 100 to move a blade into engagement with a roof, thereby facilitating cutting the roof with the blade. In some embodiments, the method includes preventing or otherwise inhibiting the movement of the blade beyond a certain point, thereby controlling a depth of the cut. In some embodiments, the method includes rotating a handle of the roof cutter 100 away from a user until a stop assembly 140 engages with an engagement member 130 of the roof cutter 100, the stop assembly 140 and/or the engagement member 130 including a dampening mechanism 144 for softening an impact associated with such engagement. In some embodiments, the dampening mechanism 144 is configured to absorb vibrations associated with cutting the roof while the stop assembly 140 is engaged with the engagement member 130.

In the foregoing description, certain terms have been used for brevity, clearness and understanding; but no unnecessary limitations are to be implied therefrom beyond the requirements of the prior art, because such terms are used for descriptive purposes and are intended to be broadly construed. Moreover, the description and illustration of the inventions is by way of example, and the scope of the inventions is not limited to the exact details shown or described.

Although the foregoing detailed description of the present invention has been described by reference to an exemplary embodiment, and the best mode contemplated for carrying out the present invention has been shown and described, it will be understood that certain changes, modification or variations may be made in embodying the above invention, and in the construction thereof, other than those specifically set forth herein, may be achieved by those skilled in the art without departing from the spirit and scope of the invention, and that such changes, modification or variations are to be considered as being within the overall scope of the present invention. Therefore, it is contemplated to cover the present invention and any and all changes, modifications, variations, or equivalents that fall with in the true spirit and scope of the underlying principles disclosed and claimed herein. Consequently, the scope of the present invention is intended to be limited only by the attached claims, all matter contained in the above description and shown in the accompanying drawings shall be interpreted as illustrative and not in a limiting sense.

Having now described the features, discoveries and principles of the invention, the manner in which the invention is constructed and used, the characteristics of the construction, and advantageous, new and useful results obtained; the new and useful structures, devices, elements, arrangements, parts and combinations, are set forth in the appended claims.

It is also to be understood that the following claims are intended to cover all of the generic and specific features of the invention herein described, and all statements of the scope of the invention which, as a matter of language, might be said to fall therebetween.

What is claimed is:

1. A roof cutter that is moveable between a retracted configuration and a deployed configuration, thereby moving a blade of the roof cutter from a disengaged position to an engaged position relative to a roof structure, the roof cutter comprising:

a base having an engagement member, said base being movable between a retracted position and a deployed position, thereby moving the roof cutter between the retracted configuration and the deployed configuration, respectively;

a linkage assembly engaged with said base, wherein said linkage assembly comprises a second linkage member extending from a first linkage member towards a rear portion of said base, wherein said first linkage member is rotatably coupled to a front portion of said base, wherein a stop assembly is coupled to said second linkage member, wherein said stop assembly extends below an adjustment assembly and along the second linkage member, wherein the adjustment assembly selectively adjusts an amount of travel of the second linkage member relative to said engagement member, and wherein said engagement member is configured to engage with the stop assembly when the roof cutter is in the deployed configuration.

2. The roof cutter of claim 1, wherein said stop assembly comprises:

a stop member; and a dampening mechanism extending from said stop member.

3. The roof cutter of claim 2, wherein said dampening mechanism is positioned between said stop member and said engagement member.

4. The roof cutter of claim 3, wherein said dampening mechanism is configured to absorb vibrations associated with operation of the roof cutter while the stop assembly is engaged with the engagement member.

5. The roof cutter of claim 4, wherein said dampening mechanism comprises a spring.

6. The roof cutter of claim 5, wherein said stop assembly is displaced from said engagement member when the roof cutter is in the retracted configuration.

7. The roof cutter of claim 6, wherein said stop assembly is engaged with said engagement member when the roof cutter is in the deployed configuration.

8. The roof cutter of claim 1, further comprising: a first wheel assembly coupled to a distal end of said first linkage member of said linkage assembly such that said first wheel assembly provides a first vertical support for the roof cutter; and a second wheel assembly coupled to said rear portion of said base such that said second wheel assembly provides a second vertical support for the roof cutter, wherein said first linkage member is rotatably coupled to said front portion of said base, wherein moving the roof cutter from the retracted configuration to the deployed configuration comprises rotating said first linkage member relative to said base such that said front portion of said base moves towards a top surface of the roof structure, wherein a second end of said second linkage member extends from a proximal end of said first linkage member towards said rear portion of said base, wherein the second linkage member is configured to inhibit the first linkage member from rotating relative to the base.

9. The roof cutter of claim 8, wherein moving said adjustment assembly controls the travel of the second linkage relative to the engagement member to control movement of the base to increase and decrease the cutting depth of the blade.

10. The roof cutter of claim 9, wherein moving the roof cutter from the retracted configuration to the deployed configuration increases a first length of a wheel base of the roof cutter.

11. The roof cutter of claim 10, wherein moving the roof cutter from the deployed configuration to the retracted configuration decreases the first length of the wheel base of the roof cutter.

12. The roof cutter of claim 11, wherein the wheel base is between an axle of a first wheel assembly and an axel of a second wheel assembly.

13. The roof cutter of claim 12, wherein said engagement member is configured to engage with the stop assembly when the roof cutter is in the deployed configuration.

14. The roof cutter of claim 13, wherein said stop assembly extends from said second linkage member of said linkage assembly to said adjustment assembly.

* * * * *